April 6, 1926.
H. A. VAIL
1,579,798
ANTIFRICTION BEARING
Filed August 22, 1923
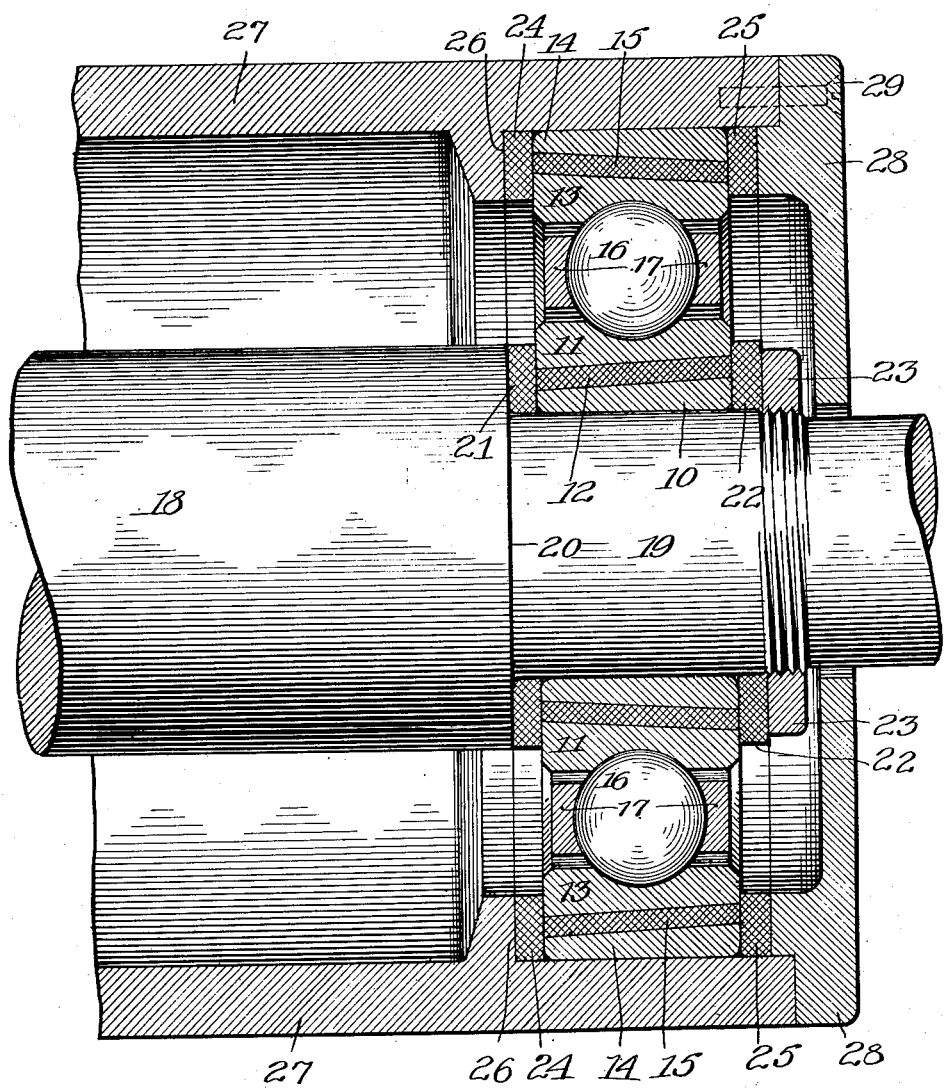
Inventor:
Henry A. Vail,
By Dyrenforth, Lee, Chritton & Wiles,
Att'ys Patented Apr. 6, 1926.

1,579,798

UNITED STATES PATENT OFFICE.

HENRY A. VAIL, OF CHICAGO, ILLINOIS.

ANTIFRICTION BEARING.

Application filed August 22, 1923. Serial No. 658,727.

*To all whom it may concern:*

Be it known that I, HENRY A. VAIL, a citizen of the United States, residing at Chicago, in the county of Cook and State of Illinois, have invented a new and useful Improvement in Antifriction Bearings, of which the following is a specification.

This invention relates to anti-friction bearings.

The main object of the invention is to provide a bearing of the anti-friction type which will not readily transmit noises from the shaft to the housing but which will tend to deaden the noises produced or received by the bearing, thereby rendering the bearing to a much greater degree noiseless. At the same time the bearing, by the same construction may be made a non-conductor of electricity.

These and other objects are accomplished by the invention which is fully described in the following specification and shown in the accompanying drawings, in which:

The figure is a longitudinal section through a bearing and housing embodying the invention.

The bearing as illustrated shows a single row radial ball bearing having an inner race member consisting of an inner annulus 10 and an outer annulus 11 with an annular ring of a sound deadening material 12 as hard fibre or the like. It will be noted that the facing portion of the two members 10 and 11 are made slightly conical so that when the fibre 12 is placed between them they may be driven tightly together. The inner race member then becomes virtually an integral member and it is then ground as is now done where this member is a single integral piece of tempered steel.

In the same way the outer race member consists of an annulus 13 and an outer annulus 14 of tempered steel separated by an annular band of fibre 15 which is tightly driven between the two annular members. Balls 16 separate the inner and outer members and these may carry separators 17 in any well known manner.

The bearing is shown mounted on a shaft 18 having a reduced portion 19 which forms a shoulder 20. An annular ring of fibre 21 is interposed between the inner race member and the shoulder 20 and a similar ring 22 lies between the inner annular member and the nut 23 which holds these members rigidly against the shoulder 20.

Annular rings 24 and 25 are also placed along the sides of the outer race member. These are pressed against the shoulder 26 in the housing 27 by means of a cover 28 which is held by a series of screws 29.

In the foregoing construction the sound deadening rings 12 and 15 serve to prevent noise being transmitted from the shaft 18 through the bearing to the housing 27. The annular rings 21, 22, 24 and 25 serve to completely insulate the annular race members 11 and 13 from the shaft 18 and the housing 27.

At the same time it will be observed that the inner and outer race members which are preferably made to the standard dimensions for such ball bearings permit these bearings to be used interchangeably with other bearings now on the market. By this arrangement the bearing becomes not only practically proof against the transmission of sound from the shaft to the housing but also acts as an electrical insulator.

While I have shown and described but a few embodiments of my invention, it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

I claim:

1. An anti-friction bearing comprising inner and outer race members, one of said members being made of hard metal sections separated by a section of insulating material, said sections being tapered and pressed firmly together while being assembled, whereby energy is prevented from passing from one hard metal section to the other.

2. An anti-friction bearing comprising inner and outer race members, one of said members being made of hard metal sections separated by a section of sound insulating material, said sections being tapered and pressed firmly together while being assembled, whereby sound is prevented from passing from one hard metal section to the other.

HENRY A. VAIL.